(12) United States Patent
Myerberg et al.

(10) Patent No.: US 11,718,033 B2
(45) Date of Patent: Aug. 8, 2023

(54) SYSTEMS AND METHODS FOR POWDER RECOVERY, CLEANING, AND BLENDING, FOR ADDITIVE MANUFACTURING

(71) Applicant: Desktop Metal, Inc., Burlington, MA (US)

(72) Inventors: Jonah Myerberg, Lexington, MA (US); Peter Schmitt, Brookline, MA (US)

(73) Assignee: Desktop Metal, Inc., Burlington, MA (US)

( * ) Notice: Subject to any disclaimer, the term of this patent is extended or adjusted under 35 U.S.C. 154(b) by 134 days.

(21) Appl. No.: 17/098,739

(22) Filed: Nov. 16, 2020

(65) Prior Publication Data
US 2021/0146622 A1 May 20, 2021

Related U.S. Application Data

(60) Provisional application No. 62/936,214, filed on Nov. 15, 2019.

(51) Int. Cl.
| | |
|---|---|
| *B29C 64/357* | (2017.01) |
| *B29C 64/35* | (2017.01) |
| *B33Y 40/00* | (2020.01) |
| *B33Y 30/00* | (2015.01) |
| *B07B 9/00* | (2006.01) |

(52) U.S. Cl.
CPC .............. *B29C 64/357* (2017.08); *B07B 9/00* (2013.01); *B29C 64/35* (2017.08); *B33Y 30/00* (2014.12); *B33Y 40/00* (2014.12)

(58) Field of Classification Search
CPC ....... B29C 64/357; B29C 64/35; B22F 10/68; B22F 10/73
See application file for complete search history.

(56) References Cited

U.S. PATENT DOCUMENTS

| | | | | |
|---|---|---|---|---|
| 2004/0084814 A1* | 5/2004 | Boyd | ..................... | B33Y 40/00 264/109 |
| 2006/0214335 A1* | 9/2006 | Cox | ...................... | B29C 64/357 425/375 |
| 2013/0052291 A1* | 2/2013 | Morikawa | ............... | B29C 64/35 425/135 |
| 2017/0252975 A1* | 9/2017 | Park | ....................... | B33Y 30/00 |
| 2019/0241378 A1* | 8/2019 | Ocken | ...................... | B65D 7/40 |
| 2020/0122230 A1* | 4/2020 | Hideshima | ............ | B29C 64/357 |
| 2021/0206097 A1* | 7/2021 | Schalk | .................. | B29C 64/259 |
| 2021/0387415 A1* | 12/2021 | Crabtree | ................ | B33Y 50/00 |
| 2022/0258423 A1* | 8/2022 | von Burg | ............. | B29C 64/153 |

* cited by examiner

*Primary Examiner* — Mary Lynn F Theisen
(74) *Attorney, Agent, or Firm* — Jonathan D. Hall; Oak Law, PLLC (57) ABSTRACT

A method of recycling build material powder including collecting in a keg an amount of excess build material powder during the additive manufacturing of a part cake. The part cake and keg are transferred to a de-powdering station. The part cake is de-powdered to release a mixture of reusable powder and contaminants. The mixture is sieved to remove the contaminants and deposit the reusable powder to the keg.

21 Claims, 7 Drawing Sheets

SYSTEMS AND METHODS FOR POWDER RECOVERY, CLEANING, AND BLENDING, FOR ADDITIVE MANUFACTURING

TECHNICAL FIELD

Various aspects of the present disclosure relate generally to systems and methods for recovering and recycling materials utilized in additive manufacturing, and specifically, metal powder in three-dimensional printing of metal parts.

BACKGROUND OF THE DISCLOSURE

Powder bed three-dimensional fabrication is an additive manufacturing technique based on binding particles of a powder to form a three-dimensional object within the powder bed. Binder jetting is one type of powder bed three-dimensional fabrication. Binder jetting includes delivering powder, e.g., metal powder, to a powder bed, spreading the powder into a layer, and depositing a binder material, e.g., a liquid binder, on top of the powder to bind the powder together. The binder material is deposited in a pre-determined pattern (e.g., in a cross-sectional shape of the three-dimensional object) to successive layers of powder in a powder bed such that the powder particles bind to one another where the binder material is located to form a three-dimensional green part. In the context of binder jet printing of three-dimensional metal objects, a three-dimensional green part may be formed by printing as described above, and may then be processed further into a finished three-dimensional metal part. For example, excess, unbound metal powder may be removed from the powder bed. Then, the three-dimensional green part may be heated in a furnace to remove the binder material or sintered to form the final, three-dimensional part.

As mentioned above, during binder jetting, large amounts of excess, unbound metal powder may remain once the three-dimensional metal part is complete. Metal powder may be expensive and a high cost to users, and, as such, it is desired to recycle and reuse any excess metal powder. Conventional binder jetting systems may require multiple subsystems and/or devices to recycle excess, unbound metal powder. The use of various components and steps may increase the size and complexity of binder jetting systems, as well as the costs of these systems. Current binder jetting systems, such as those described above, comprise various components dedicated for each task. For example, de-powdering the three-dimensional part, collecting the powder, cleaning the powder, blending the powder, and storing the powder may be performed separately within different systems and/or devices. Also, inefficiently recycling of the extra metal powder increases time and costs for manufacturers of three-dimensional parts. For at least these reasons, effective and efficient devices and methods for collecting, recycling, and repurposing excess metal powder are desired.

The systems and methods of the current disclosure may address one or more of the deficiencies described above or may address other aspects of the prior art.

SUMMARY

Embodiments of the present disclosure include systems and methods to facilitate or improve the efficacy or efficiency of additive manufacturing by facilitating the reuse of build material powder. A method of recycling build material powder includes collecting in a keg an amount of excess build material powder during the additive manufacturing of a part cake. The part cake and keg are transferred to a de-powdering station. The part cake is de-powdered to release a mixture of reusable powder and contaminants. The mixture is sieved to remove the contaminants and deposit the reusable powder to the keg.

In certain embodiments, virgin powder is added to the reusable powder and mixed to produce a suitable powder for use in further additive manufacturing. The keg may include a number of paddles to facilitate mixing and distribution of powder entering the keg.

DETAILED DESCRIPTION

Figure 1A:
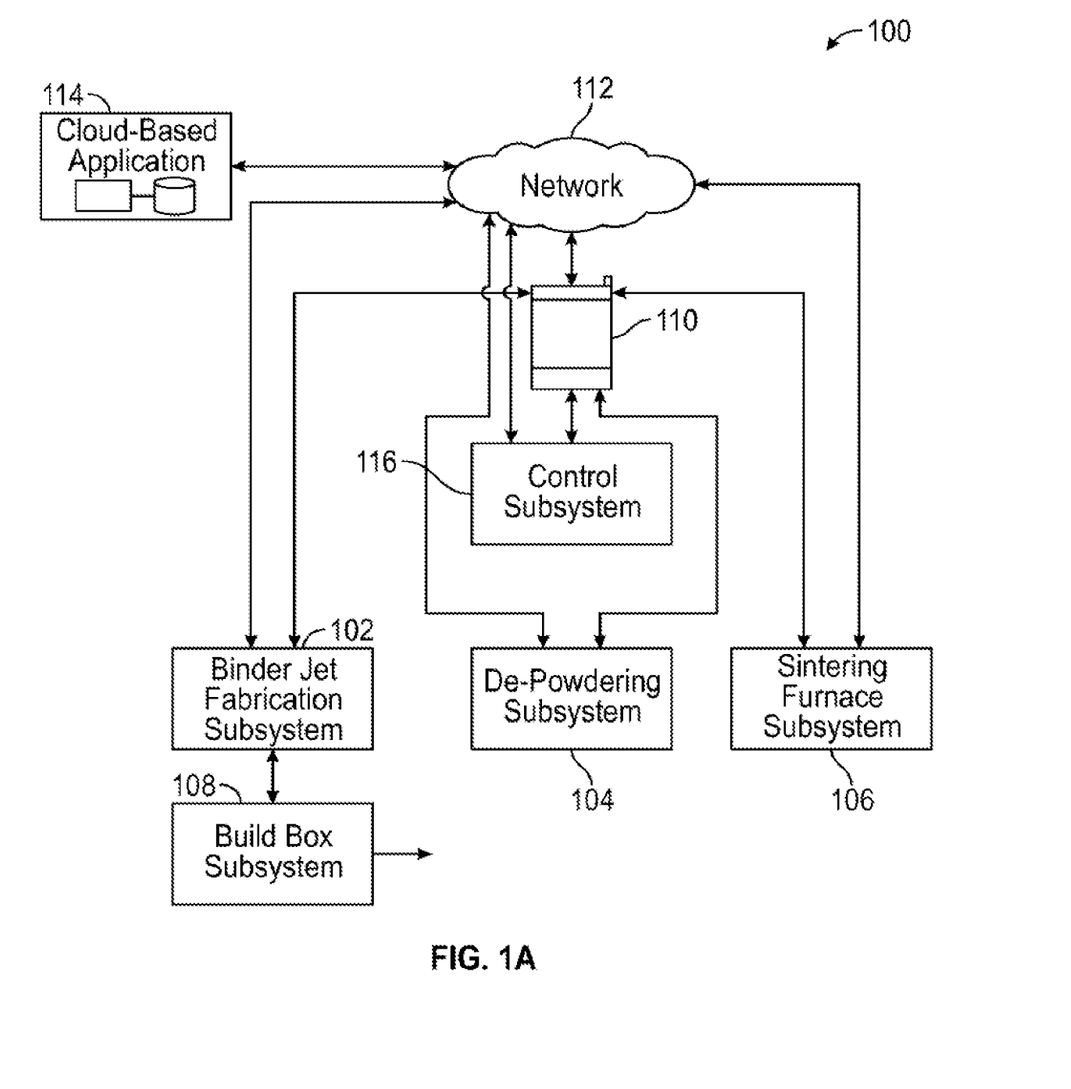
FIG. 1A is a system diagram of a printing and processing system as usable with embodiments.

FIG. 1A illustrates an exemplary system 100 for forming a printed object, according to an embodiment of the present disclosure. System 100 may include a printer, for example, a binder jet fabrication subsystem 102, and a treatment site(s), for example, a de-powdering subsystem 104 and a sintering furnace subsystem 106. Binder jet fabrication subsystem 102 may be used to form an object from a build material, for example, by delivering successive layers of a powder build material and binder material to a build plate. As shown in FIG. 1A, a build box subsystem 108 may be movable and may be selectively positioned in one or more of binder jet fabrication subsystem 102, de-powdering subsystem 104, and sintering furnace subsystem 106. For example, build box subsystem 108 may be coupled or couplable to a movable assembly. Alternatively, a conveyor (not shown) may help transport the object between portions of system 100.

The build material may be a bulk metallic powder delivered and spread in successive layers. The binder material may be, for example, a polymeric liquid that may be deposited onto and may be absorbed into layers of the build material. One or more of binder jet fabrication subsystem 102, de-powdering subsystem 104, and sintering furnace subsystem 106 may include a shaping station to shape the printed object and a debinding station to treat the printed object to remove binder material from the build material. Furnace subsystem 106 may heat or sinter the build material of the printed object. System 100 may also include a user interface 110, which may be operatively coupled to one or more components, for example, to binder jet fabrication subsystem 102, de-powdering subsystem 104, and sintering furnace subsystem 106, etc. In some embodiments, user interface 110 may be a remote device (e.g., a computer, a tablet, a smartphone, a laptop, etc.). User interface 110 may be wired or wirelessly connected to one or more of binder jet fabrication subsystem 102, de-powdering subsystem 104, and sintering furnace subsystem 106. System 100 may also include a control subsystem 116, which may be included in user interface 110, or may be a separate element.

Binder jet fabrication subsystem 102, de-powdering subsystem 104, sintering furnace subsystem 106, user interface 110, and/or control subsystem 116 may be connected to the other components of system 100 directly or via a network 112. Network 112 may include the Internet and may provide communication through one or more computers, servers, and/or handheld mobile devices, including the various components of system 100. For example, network 112 may provide a data transfer connection between the various components, permitting transfer of data including, e.g., geometries, the printing material, one or more support and/or support interface details, binder materials, heating or sintering times and temperatures, etc., for one or more parts or one or more parts to be printed.

Moreover, network 112 may be connected to a cloud-based application 114, which may also provide a data transfer connection between the various components and cloud-based application 114 in order to provide a data transfer connection, as discussed above. Cloud-based application 114 may be accessed by a user in a web browser, and may include various instructions, applications, algorithms, methods of operation, preferences, historical data, etc., for forming the part or object to be printed based on the various user-input details. Alternatively or additionally, the various instructions, applications, algorithms, methods of operation, preferences, historical data, etc., may be stored locally on a local server (not shown) or in a storage or processing device within or operably coupled to one or more of binder jet fabrication subsystem 102, de-powdering subsystem 104, sintering furnace subsystem 106, user interface 110, and/or control subsystem 116. In this aspect, binder jet fabrication subsystem 102, de-powdering subsystem 104, sintering furnace subsystem 106, user interface 110, or control subsystem 116 may be disconnected from the Internet or other networks, which may increase security protections for the components of system 100. In either aspect, an additional controller (not shown) may be associated with one or more of binder jet fabrication subsystem 102, de-powdering subsystem 104, and sintering furnace subsystem 106, etc., and may be configured to receive instructions to form the printed object and to instruct one or more components of system 100 to form the printed object.

Figure 1B:
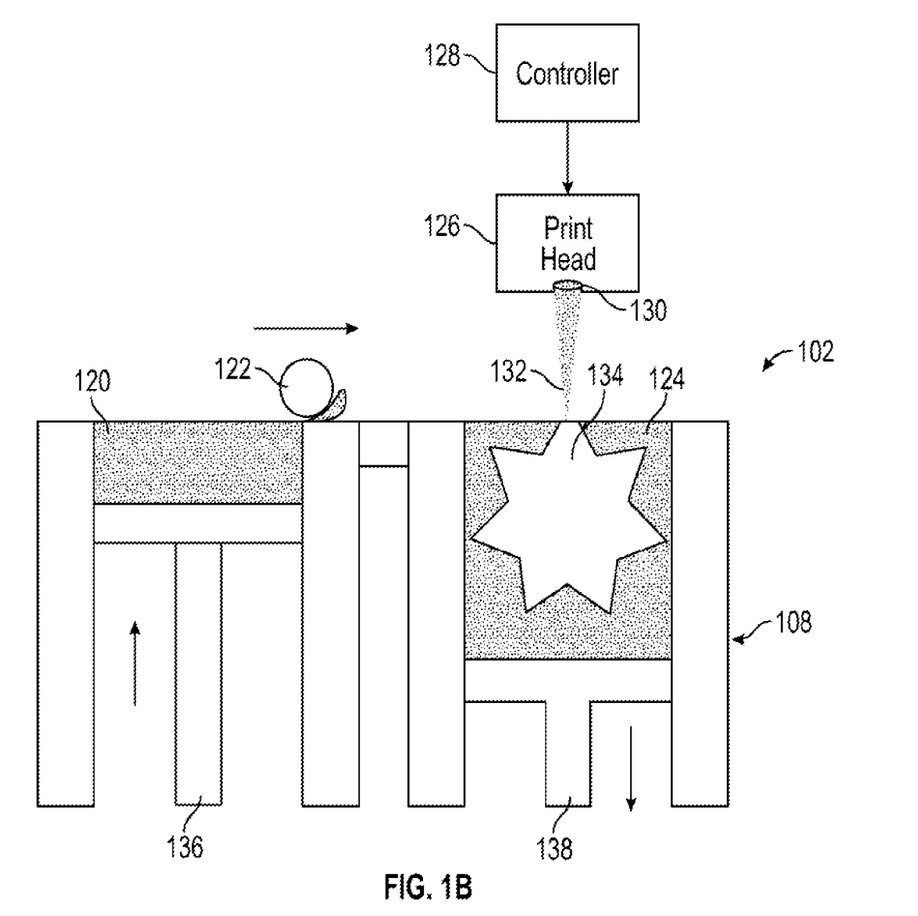
FIG. 1B is a system diagram of an exemplary binder jet fabrication subsystem.

FIG. 1B illustrates an exemplary binder jet fabrication subsystem 102 operating in conjunction with build box subsystem 108. Binder jet fabrication subsystem 102 may include a powder supply 120, a spreader 122 (e.g., a roller) configured to be movable across powder bed 124 of build box subsystem 108, a print head 126 movable across powder bed 124, and a controller 128 in operable communication (e.g., wireless, wired, Bluetooth, etc.) with print head 126. Powder bed 124 may comprise powder particles, for example, micro-particles of a metal, micro-particles of two or more metals, other materials, such as ceramic, or plastic, or a composite of one or more metals and/or other materials.

Spreader 122 may be movable across powder bed 124 to spread a layer of powder, from powder supply 120, across powder bed 124. Print head 126 may comprise a discharge orifice 130 and, in certain implementations, may be actuated to dispense a binder material 132 (e.g., through delivery of an electric current to a piezoelectric element in mechanical communication with binder material 132) through discharge orifice 130 to the layer of powder spread across powder bed 124. In some embodiments, the binder material 132 may be one or more fluids configured to bind together powder particles.

In operation, controller 128 may actuate print head 126 to deliver binder material 132 from print head 126 to successive layers of the powder in a pre-determined two-dimensional pattern, as print head 126 moves across powder bed 124. In embodiments, the movement of print head 126, and the actuation of print head 126 to deliver binder material 132, may be coordinated with movement of spreader 122 across powder bed 124. For example, spreader 122 may spread a layer of the powder across powder bed 124, and print head 126 may deliver the binder in a pre-determined, two-dimensional pattern, to the layer of the powder spread across powder bed 124, to form a layer of one or more three-dimensional objects 134. These steps may be repeated (e.g., with the pre-determined two-dimensional pattern for each respective layer) in sequence to form subsequent layers until, ultimately, the one or more three-dimensional objects 134 are formed in powder bed 124.

Although the exemplary embodiment depicted in FIG. 1B depicts a single object 134 being printed, it should be understood that the powder bed 124 may include more than one object 134 in embodiments in which more than one object 134 is printed at once. Further, the powder bed 124 may be delineated into two or more layers, stacked vertically, with one or more objects disposed within a layer.

An example of binder jet fabrication subsystem 102 may comprise a powder supply actuator mechanism 136 that elevates powder supply 120 as spreader 122 layers the powder across powder bed 124. Similarly, build box subsystem 108 may comprise a build box actuator mechanism 138 that lowers powder bed 124 incrementally as each layer of powder is distributed across powder bed 124.

In another exemplary embodiment, layers of powder may be applied to powder bed 124 by a hopper followed by a compaction roller or spreader. The hopper may move across powder bed 124, depositing powder along the way. The compaction roller may be configured to follow the hopper, spreading the deposited powder to form a layer of powder.

Figure 1C:
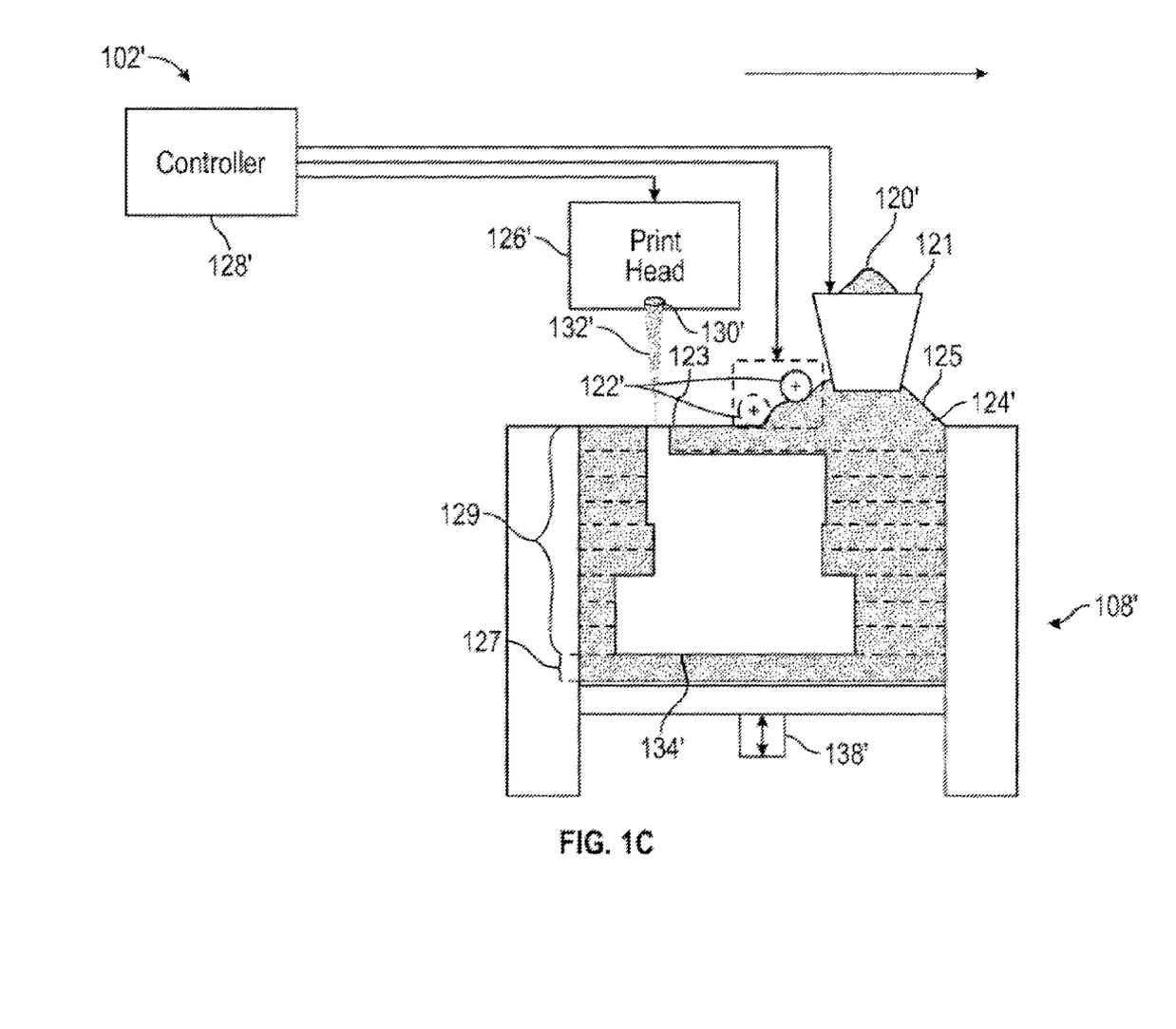
FIG. 1C is a system diagram of another exemplary binder jet fabrication subsystem.

For example, FIG. 1C illustrates another binder jet fabrication subsystem 102' operating in conjunction with a build box subsystem 108'. In this aspect, binder jet fabrication subsystem 102' may include a powder supply 120' in a metering apparatus, for example, a hopper 121. Binder jet subsystem 102' may also include one or more spreaders 122' (e.g., one or more rollers) configured to be movable across powder bed 124' of build box subsystem 108', a print head 126' movable across powder bed 124', and a controller 128' in operable communication (e.g., wireless, wired, Bluetooth, etc.) with one or more of hopper 121, spreaders 122', and print head 126'. Powder bed 124' may comprise powder particles, for example, micro-particles of a metal, micro-particles of two or more metals, other materials, such as ceramic, or plastic, or a composite of one or more metals and/or other materials.

Hopper 121 may be any suitable metering apparatus configured to meter and/or deliver powder from powder supply 120' onto a top surface 123 of powder bed 124'. Hopper 121 may be movable across powder bed 124' to deliver powder from powder supply 120' onto top surface 123. The delivered powder may form a pile 125 of powder on top surface 123.

The one or more spreaders 122' may be movable across powder bed 124' downstream of hopper 121 to spread powder, e.g., from pile 125, across powder bed 124. The one or more spreaders 122' may also compact the powder on top surface 123, or a separate compaction device, e.g., roller, may also be included. In either aspect, the one or more spreaders 122' (or compaction devices) may form a layer 127 of powder. The aforementioned powder delivery and spreading steps may be successively performed in order to form a plurality of layers 129 of powder. Additionally, although two spreaders 122' are shown in FIG. 1C, binder jet fabrication subsystem 102' may include one, three, four, etc. spreaders 122'.

Print head 126' may comprise one or more discharge orifices 130' and, in certain implementations, may be actuated to dispense a binder material 132' (e.g., through delivery of an electric current to a piezoelectric element in mechanical communication with binder material 132') through discharge orifice 130' to the layer of powder spread across powder bed 124'. In some embodiments, the binder material 132' may be one or more liquids configured to bind together powder particles.

In operation, controller 128' may actuate print head 126' to deliver binder material 132' from print head 126' to each layer 127 of the powder in a pre-determined two-dimensional pattern, as print head 126' moves across powder bed 124'. As shown in FIG. 1C, controller 128' may be in communication with hopper 121 and/or the one or more spreaders 122' as well, for example, to actuate the movement of hopper 121 and the one or more spreaders 122' across powder bed 124'. Additionally, controller 128' may control the metering and/or delivery of powder by hopper 121 from powder supply 120 to top surface 123 of powder bed 124'. In embodiments, the movement of print head 126', and the actuation of print head 126' to deliver binder material 132', may be coordinated with movement of hopper 121 and the one or more spreaders 122' across powder bed 124'. For example, hopper 121 may deliver powder to powder bed 124, and spreader 122' may spread a layer of the powder across powder bed 124. Then, print head 126 may deliver the binder in a pre-determined, two-dimensional pattern, to the layer of the powder spread across powder bed 124', to form a layer of one or more three-dimensional objects 134'. These steps may be repeated (e.g., with the pre-determined two-dimensional pattern for each respective layer) in sequence to form subsequent layers until, ultimately, the one or more three-dimensional objects 134' are formed in powder bed 124'.

Although the example embodiment depicted in FIG. 1C depicts a single object 134' being printed, it should be understood that the powder bed 124' may include more than one object 134' in embodiments in which more than one object 134' is printed at once. Further, the powder bed 124' may be delineated into two or more layers 127, stacked vertically, with one or more objects disposed within a layer.

As in FIG. 1B, build box subsystem 108' may comprise a build box actuator mechanism 138' that lowers powder bed 124' incrementally as each layer 127 of powder is distributed across powder bed 124'. Accordingly, hopper 121, the one or more spreaders 122', and print head 126' may traverse build box subsystem 108' at a pre-determined height, and build box actuator mechanism 138' may lower powder bed 124 to form object 134'.

Although not shown, binder jet fabrication subsystems 102, 102' may include a coupling interface that may facilitate the coupling and/or uncoupling of the build box subsystems 108, 108' with the binder jet fabrication subsystems 102, 102', respectively. The coupling interface may comprise one or more of (i) a mechanical aspect that provides for physical engagement, and/or (ii) an electrical aspect that supports electrical communication between the build box subsystem 108, 108' to the binder jet fabrication subsystem 102, 102'.

Once the three-dimensional green part, also referred to herein as a part cake, is printed, the build box including the three-dimensional green part may be moved to a de-powdering station, as described above. During de-powdering, any loose, used metal powder may be collected into a separate device or container. After collection, the used metal powder may be cleaned, blended with fresh, i.e., virgin, metal powder, stored for later use, and/or transferred for reuse back to the printer. Each of these steps may require various systems, devices, and/or containers for the metal powder. For example, the metal powder may be collected in one container, blended in a different container and/or system, and stored in another different container.

Embodiments of the present disclosure combine multiple steps, for example, the recovery, cleaning, blending, and storage, of loose, excess metal powder, into a single unit or device. The devices and methods disclosed herein may greatly increase the efficiency and effectiveness of recycling excess metal powder, while reducing the complexity and size of additive manufacturing systems. While reference is made herein to binder jetting systems, it is recognized that the embodiments herein may be used for any additive manufacturing system that uses loose metal powder, for example, powder bed fusion (e.g., laser sintering).

According to the present disclosure, a binder jetting system may utilize a container, referred to herein as a keg 200, as shown above in FIG. 2, for collecting excess metal powder and preparing it for storage and/or reuse. A keg according to embodiments of the present disclosure may be any suitable shape and/or size to interface with various components of the binder jetting system, e.g., with a printer, de-powdering station, or blender, as shown below in FIG. 3. For example, the keg may be positioned in an upright position (with the opening 201 facing upwards) in the de-powdering station or the printer in order to collect loose metal powder, may be positioned downwards (with the opening facing down) to dispense loose powder back into the printer for reuse, or may be positioned on its side to be rotated on its side for mixing the metal powder within it. All of these features will be described in detail further below.

Figure 2:
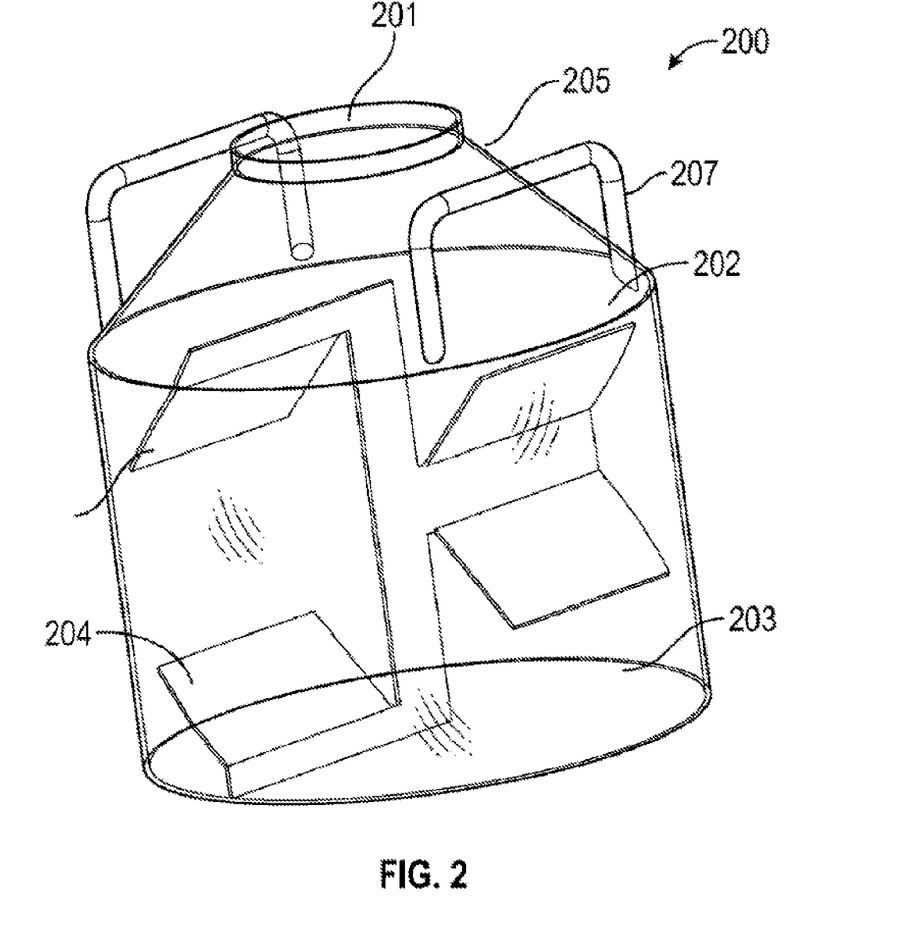
FIG. 2 is an exemplary keg for use with embodiments.

The keg may have any volume sufficient to hold various amounts of loose metal powder for printing desired three-dimensional parts. As shown in FIG. 2, the keg may include a top section 202 and bottom section 203. For example, the top section may include an angled portion 205 leading to an opening, wherein the opening may allow metal powder to more easily flow in and out of the keg. In some embodiments, the opening may be able to couple to a funnel or a valve, wherein the funnel or valve may be further able to couple to a station of the binder jetting system to facilitate transfer of metal powder into and out of the keg and between the keg and other components of the binder jetting system.

The difference in shape between the top section and bottom section of the keg may impact the volume of the keg, as well as produce asymmetric blending of the metal powder within the keg, as will be described further below. The shape of the keg may be altered to be more symmetrical to produce more symmetric blending, if desired. The opening 201 of the keg may have any size suitable for the powder to flow into and out of the keg. For example, the opening 201 may have a diameter ranging from about 2 inches to about 8 inches, e.g., about 4 inches. The angle of repose of the metal powder to be contained within the keg may affect what diameter of the opening will allow the powder to pour more efficiently into and out of the keg. Angle of repose refers to a granular material's steepest angle of descent or dip relative to the horizontal plane to which a material can be piled without slumping or spreading. Embodiments of the keg may include paddles 204 configured to blend the metal powder contained within the keg as the keg is rotated on its side. As shown in FIG. 2, the keg may include multiple paddles that may separate, i.e., split, and recombine the powder. Referring to FIG. 2, the paddles 204 on the right side of the image are angled away from one another, which may allow the powder to separate as it flows over the paddles 204, and the paddles 204 on the left side of the image are angled towards one another to recombine the powder as the powder flows over the paddles. In some embodiments, the keg may include paddles 204 that only separate the powder, as the powder may naturally recombine in areas of the keg between the paddles 204. In other embodiments, the keg may include multiple recombining or separating paddles in any suitable arrangement within the keg. This combination of separating and recombining the powder in the keg may serve to properly mix the used powder with any new powder that may be added. To facilitate mixing, the keg may be placed onto a blender station, as shown below in FIGS. 3-5, which may include one or more rollers, which may be configured to roll and rotate the keg placed on top of the rollers. When the keg rotates, the paddles within the keg also rotate with the keg to mix the metal powder. Including paddles within the keg may eliminate the need to remove the powder from, e.g., the depowdering station, and transfer it to a separate standalone blender or mixing machine, and then having to transfer the mixed powder back into a container for further use or storage. In other words, the metal powder may be collected, blended, stored, and/or reused within a single keg, which may conveniently interface with other portions of the additive manufacturing system for powder collection and refill.

As shown in FIG. 2, the keg may include at least one handle or a pair of handles 207 to facilitate movement of the keg between the various stations of a binder jetting system. In alternative embodiments, the keg may not include any handles, such as the kegs shown in FIG. 3 below. Once the keg is filled with metal powder, the keg may be heavy. As such, the keg may be placed on a separate transport station to be wheeled or rolled between the various stations. For example, the keg may be placed on a conveyer or rolling station.

The keg may be composed of any appropriate material. Metal powder may be abrasive, such that it may corrode the inside of the keg, causing any material making up the composition of the keg to possibly mix with and contaminate the metal powder itself. To inhibit contamination, the key may be formed of one or more materials that are harder than the metal powder intended to be contained within the keg. The keg may also be formed of an electrically conductive material and may be grounded during mixing to dissipate static electricity. For example, in some aspects, the keg may be composed of aluminum, anodized aluminum, static dissipative materials, electrically conductive plastic, or combinations of materials thereof. As mentioned above, the keg may hold a volume of metal powder sufficient to print desired three-dimensional parts. A full volume of the keg may correspond to a volume of metal powder needed for the printer, although so long as the volume contained within the keg is known, the key may be dimensioned to contain any suitable volume of metal powder. After the three-dimensional parts are printed, and any loose, excess metal powder is collected and cleaned, fresh, i.e., virgin, metal powder may be added to the excess metal powder contained within the keg. Adding virgin metal powder may increase the total amount of metal powder within the keg to the volume needed for printing the desired three-dimensional parts (assuming that the volume of metal powder contained within the keg corresponds with the amount of metal powder needed for printing). A user may then feed the metal powder from the keg back into the printer, so that a new set of three-dimensional parts may be printed. This aspect will be discussed below in further detail. The virgin metal powder and excess metal powder may require adequate mixing such that the metal powders may combine and produce a mixture of metal powders that is more consistent throughout and is appropriate for use in a printer of a binder jetting system, or other metal powder based additive manufacturing system.

Methods of recycling and reusing loose, excess metal powder will be discussed below, with reference to FIG. 3 above. The printer 301 may include a keg 302 according to the present disclosure positioned underneath the build plate. During printing and/or after printing of the three-dimensional green part (referred to in FIG. 3 as a "part cake" 303), excess metal powder may be pushed aside by a spreader or other component of the printer, such that the excess metal powder may fall into the keg 302. After the three-dimensional green part is complete, the build box and any parts therein may be transferred to a de-powder station 305 and placed atop a work surface 306 of the de-powder station. The keg 302 may also be transferred from the printer to the de-powder station 305 And positioned underneath a work surface 306 of the de-powder station 305. In other aspects, a separate keg may be positioned in the de-powder station. It should be noted that in some embodiments, a keg may only be configured to couple with the de-powder station, and the printer may not be configured for use with a keg (unlike the embodiment shown in FIG. 3).

The work surface of the de-powder station may include various openings such that during the de-powdering process, any loose, excess metal powder may fall through the work surface and into the keg. For example, openings of the work surface may be a grate. A build box containing loose, unbound metal powder and the printed parts may be placed on a grate of the de-powder station, and the loose metal powder may pass though the grate, while the green parts remain on top of the grate. According to various embodiments of the present disclosure, the de-powder station may include a sieve 307 positioned below the grate through which the loose powder passes after it falls through the grate. A sieve as utilized in the disclosed systems and methods may separate any unwanted materials from the used, excess metal powder. For example, the excess metal powder may include debris, portions of green parts that have broken off, and/or clumps of metal powder that are unable to be reused. Any appropriate sieve may be used, such that the size of the openings allow any loose metal powder that may be reused to be directed to the keg. Alternatively, any debris and unusable metal powder may be transferred to an container 308 for scrap powder. The sieve may be an ultrasonic sieve shaker. Alternatively, the sieve may be a strainer, e.g., a mesh strainer, designed at an angle such that any debris and unusable material may be collected on top, so that it may fall off an edge of the sieve and into an area or container for the scrap powder. Once the scrap powder is collected, it may be discarded. In certain embodiments, a dosing rate into the sieve and or power delivered to the sieve can be controlled individually or collectively to optimize a sieving parameter, such as the rate of powder loss to trash.

In alternative embodiments, a filter may be placed above the sieve to collect debris and contaminants. The filter may be any appropriate size and shape so as to properly fit in the de-powder station, underneath the build box and three-dimensional green part, and above the sieve.

The flow of loose metal powder from the build box during de-powdering may vary depending on how a user is performing the de-powdering step. The de-powder station may include a doser 309. The doser may be placed between the keg and sieve, such that any loose metal powder is dosed at a predetermined rate to produce a more even flow to the sieve so as to not overflow the sieve. The doser may be any suitable device that may be positioned between the work station and sieve.

During de-powdering, new metal powder may be added to the de-powder station. The new metal powder may also flow through the doser and/or sieve, and into the keg, such that the keg may contain the loose, excess metal powder, as well as the new metal powder. In other embodiments, new metal powder may be added to the keg after the keg is removed from the de-powder station or may be added while the keg is at the de-powder station but not flowed through the doser or sieve.

In alternative embodiments, fines may be separated out from the loose, excess metal powder during printing and/or de-powdering. As shown in FIG. 3, the printer and/or de-powder station may also include a separate area and/or container 310 for collecting fines. Fines may be tiny, ultra-fine particles, below the minimum threshold of a particle size appropriate for use in the printer. For example, as metal powder is laid down during printing, fines may become airborne and may otherwise clog nozzles and/or orifices of the printer and disrupt the printing process. Similarly, during de-powdering, the fines may become airborne in the de-powder station. The printer and/or de-powder station may include a vortex separator, vacuum vortex, or other suitable airflow, which may entrain the fines and direct them into a separate fines container.

Figure 3:
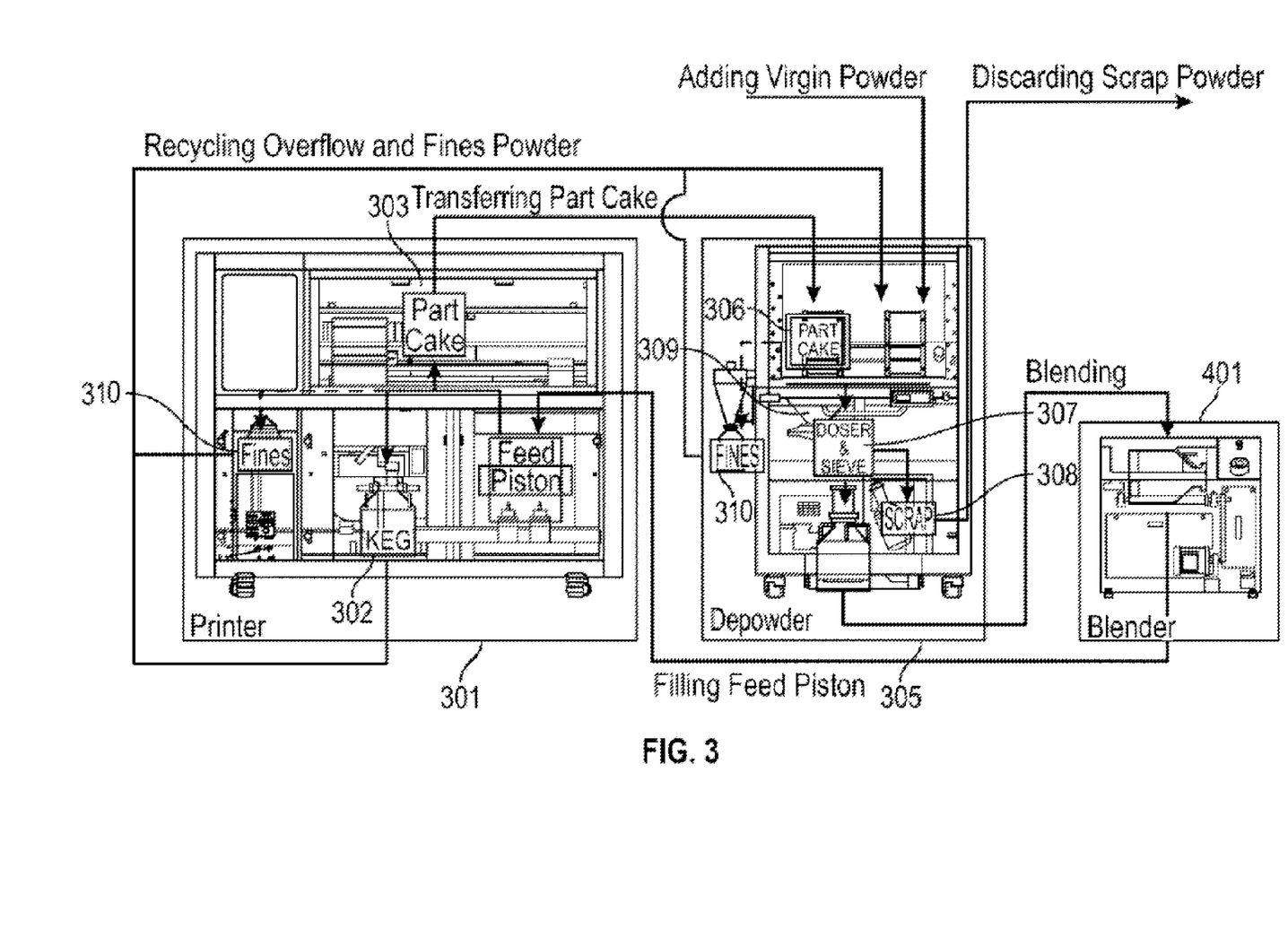
FIG. 3 depicts a first embodiment system.

As shown in FIG. 3, the fines may also be further recycled or may be discarded. For example, the fines collected from the printer and/or the de-powder station may be fed back into the de-powder station. In the de-powder station, any usable portions of the fines may flow through the doser and/or sieve, and into the keg. Any fines that may become airborne may be sucked up by a vortex separator or vacuum vortex of the de-power station and directed into a separate container. The fines may then be discarded. The collection of fines, however, is optional, and may not occur in every embodiment.

After the excess metal powder, virgin metal powder, and/or fines are directed into the keg 400, the keg 400 may be closed (e.g., capped), placed on a rolling station, conveyor belt, or carried, for example, to a blending station 401. A blending station 401 of the present disclosure may include a shelf 402 for holding the keg 400, as well as a cover 403, shown in FIGS. 4-5 below. The shelf 402 of the blending station may include one or more rollers 404 for the keg to be placed on. In embodiments in which the keg is composed of conductive metal, the keg may need to be grounded to dissipate any static charge caused by rotation of the keg and mixing of the metal powder within. The rollers may be rubber, to provide a soft surface for the keg. The rubber may be conductive or contacted somehow to dissipate any static charge. Additionally, the keg may move side to side and "walk" laterally along the rollers because of the differences in weight distribution of the metal powder mixing within the keg. For example, the metal powder may tend to move towards the angled opening end of the keg. A stop may be placed next to the keg in a direction in which the keg is expected to "walk" (i.e., on the side of the keg nearest to the opening), such that the keg may contact the stop and prevent further lateral movement by the keg. The stop may serve to ground the keg when the keg contacts the stop.

Figure 4:
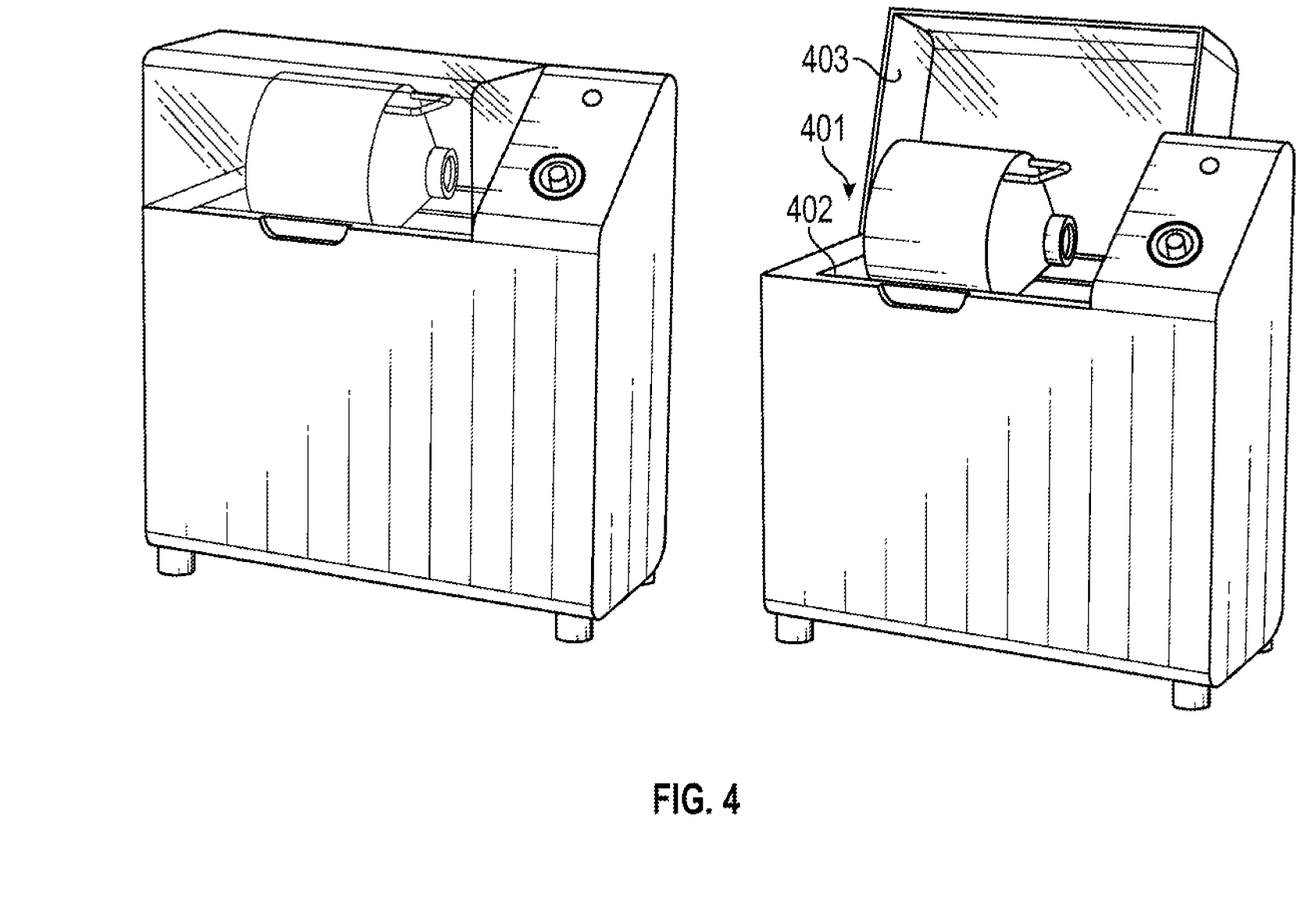
FIG. 4 depicts a blender station of an embodiment.
Figure 5:
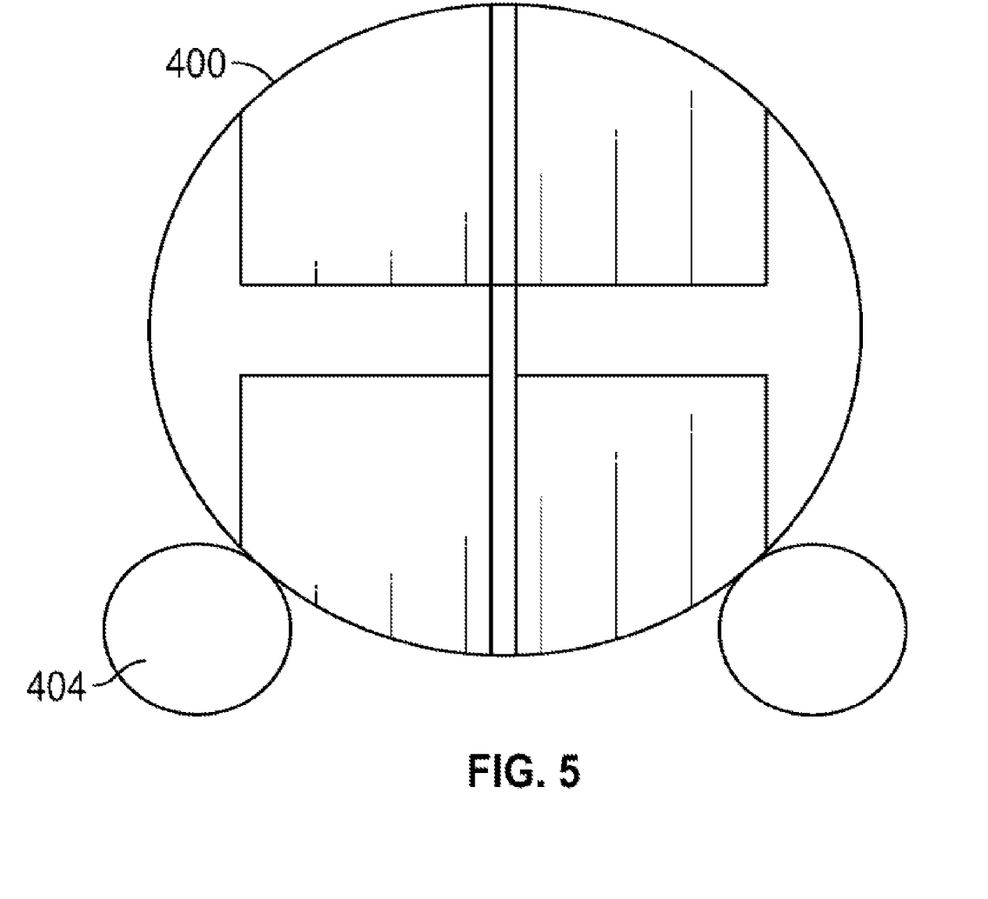
FIG. 5 is a cutaway side view of the blender station of FIG. 4.

As described above, blending the keg produces a more uniform mixture of the virgin metal powder and excess metal powder. After blending is completed, the keg may be removed from the blender and transferred via a rolling station or conveyor belt or carried, for example. The keg may be transferred to storage for a desired amount of time until the metal powder is needed. Alternatively, the keg may be transferred back to the printer for immediate reuse in further printing. A funnel and/or valve may fluidly couple the keg to at least one feed piston of the printer. The feed piston feeds the metal powder through the hopper and onto the print bed. Once the keg is empty, the keg may be placed back under the printer to restart the recovery and recycling process in embodiments in which the printer is configured for use with a keg, or the keg may be positioned in the de-powder station or stored until needed.

In the method described above, one keg may be used throughout the entire recovery and recycling process. Specifically, one keg may be used for collection of loose metal powder from the printer, then transferred to the de-powder station to collect additional metal powder, then transferred to the blending station, and then transferred for storage or back to the printer for reuse of the metal powder. In alternative embodiments, one keg may be used in the printer to collect excess metal powder during printing, while a second keg may be used in the de-powdering station and for any additional steps, e.g., blending, storage. In such case, once printing is completed, the excess metal powder collected in the keg during printing may be poured into the de-powder station. The excess metal powder may then flow through the work surface, doser, and sieve, into the second keg in the de-powder station. Or, the printer keg may remain in position for use with the next printing cycle. Alternatively, as mentioned above, the printer may not be configured for use with a keg.

In alternative embodiments, a sieve and/or doser may be located in the printer, beneath the print bed and may function similarly to the sieve and/or doser described in reference to the de-powder station. The sieve and/or doser may be fluidly coupled to the print bed and a keg such that excess metal powder removed from the print bed may flow through the sieve and/or doser, and then into a keg placed beneath the print bed. Virgin metal powder may then be added to the keg. The keg may then be transferred to the blending station. Including a sieve and/or doser in the printer may eliminate the need to pass the metal powder from the printer keg through the sieve in the de-powdering station, since the excess metal powder may be filtered and cleaned in the printer station.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed:

1. A method of recycling build material powder, comprising the steps of:
   collecting in at least one keg an amount of excess build material powder during the process of additively manufacturing a part cake and, separately, collecting in a fines collecting container an amount of printing fines generated during the process of additively manufacturing the part cake;
   transferring the part cake and the at least one keg to a de-powdering station;
   de-powdering the part cake to release a mixture of reusable powder, de-powdering fines, and contaminants;
   sieving the mixture of reusable powder and contaminants to deposit the reusable powder to the at least one keg for removing at least some of the contaminants, and separately, collecting the de-powdering fines using a fines collection system;
   combining at least one of the printing fines and the de-powdering fines with the reusable powder in the at least one keg;
   disposing at least one of the at least one kegs on a blending station and agitating the at least one keg to mix the combination of the reusable powder and at least one of the printing fines and the de-powdering fines until is suitable for further additive manufacturing of part cake.

2. The method of claim 1, further comprising the step of:
   depositing to the at least one keg an amount of virgin powder.

3. The method of claim 2, further comprising the steps of:
   coupling the at least one keg to a blender; and
   operating the blender to blend the reusable powder and the virgin powder to a consistent blend.

4. The method of claim 1 wherein during the step of de-powdering, collecting an amount of fines in a fines disposal container.

5. The method of claim 1 wherein one of during or after the step of sieving removing the contaminants to a scrap disposal container.

6. The method of claim 1 wherein during the step of sieving, selectively dosing the mixture of reusable powder and contaminants into the sieve.

7. The method of claim 6 wherein selectively dosing includes altering a dosage rate to optimize a sieving parameter.

8. The method of claim 1 wherein the selectively dosing includes ultrasonically shaking the sieve to optimize a sieving parameter.

9. A system for recycling build material powder, comprising:
   at least one keg configured to receive an amount of excess build material powder during the additive manufacturing of a part cake;
   a printing fine collection system configured to separately collect printing fines during the additive manufacture of the part cake;
   a de-powdering station configured to receive the at least one keg and the park cake and de-powder the part cake to release a mixture of reusable powder and contaminants;
   a sieve configured to separate the reusable powder from the contaminants and deposit the reusable powder to the at least one keg;
   a blending station configured to agitate at least one of the at least one kegs to mix a combination of the reusable powder and at least one of the printing fines and the de-powdering fines until it is suitable for reuse in further additive manufacturing.

10. The system of claim 9, further comprising:
    a source of virgin powder configured to provide virgin powder to the at least one keg.

11. The system of claim 10, further comprising:
    a blender configured to blend the reusable powder and the virgin powder to a consistent blend.

12. The system of claim 9 wherein the de-powdering station is configured to remove fines to a fines disposal container during de-powdering.

13. The system of claim 9 wherein the sieve is configured to remove the contaminants to a scrap disposal container.

14. The system of claim 9 wherein the de-powdering station is configured to selectively dose the mixture of reusable powder and contaminants deposited to the sieve.

15. The system of claim 14 wherein the de-powdering station is configured to alter a dosage rate to optimize a sieving parameter.

16. The system of claim 14 wherein the de-powdering station is configured to ultrasonically shake the sieve to optimize a sieving parameter.

17. A method of recycling build material powder, comprising the steps of:
    disposing a part cake and at least one keg in a de-powdering station;
    de-powdering the part cake to release a mixture of reusable powder and contaminants; and
    sieving the mixture of reusable powder and contaminants to deposit the reusable powder to the at least one keg while removing the contaminants;
    combining at least one of printing fines and an amount of de-powdering fines, collected by a de-powdering fines collection system during an additive manufacturing process that created the part cake, with the reusable powder in the keg; and
    disposing at least one of the at least one kegs on a blending station and agitating the at least one keg to mix the combination of the reusable powder and at least one of the printing fines and the de-powdering fines until suitable for further additive manufacturing of part cake.

18. The method of claim 17, further comprising the step of:
    depositing to the at least one keg an amount of virgin powder.

19. The method of claim 18, further comprising the steps of:
    coupling the at least one keg to a blender; and
    operating the blender to blend the reusable powder and the virgin powder to a consistent blend.

20. The method of claim 17 wherein during the step of de-powdering, collecting an amount of fines in a fines disposal container.

21. The method of claim 1 further comprising the step of sieving the excess build material powder.

* * * * *